United States Patent [19]

Ostling

[11] 4,298,205
[45] Nov. 3, 1981

[54] SEALING ELEMENT
[75] Inventor: Ingemar K. Ostling, Ronninge, Sweden
[73] Assignee: Sandvik Aktiebolag, Sandviken, Sweden
[21] Appl. No.: 85,761
[22] Filed: Oct. 17, 1979

Related U.S. Application Data

[63] Continuation of Ser. No. 878,896, Feb. 17, 1978, abandoned.

[30] Foreign Application Priority Data

Feb. 17, 1977 [SE] Sweden .................................. 7701745

[51] Int. Cl.³ ............................................. F16J 15/34
[52] U.S. Cl. .................................... 277/197; 277/96.2
[58] Field of Search ................ 277/96.2, 96, 197, 199, 277/81 R

[56] References Cited

U.S. PATENT DOCUMENTS 3,101,200  8/1963  Tracy ............................ 277/96.2
3,231,289  1/1966  Carrell .............................. 277/199
3,547,452 12/1970  Hirata ................................ 277/65

Primary Examiner—Robert I. Smith
Attorney, Agent, or Firm—Burns, Doane, Swecker & Mathis

[57] ABSTRACT

In a sealing assembly of the type in which a pair of sealing elements contain mutually engaging sealing surfaces. The sealing surfaces are formed by the faces of a plurality of rods which are annularly arranged so as to present a continuous sealing surface. The rods are formed of hard material such as cemented carbide.

14 Claims, 6 Drawing Figures

SEALING ELEMENT

This is a continuation of application Ser. No. 878,896, filed Feb. 17, 1978 and now abandoned.

BACKGROUND AND OBJECTS OF THE INVENTION

This invention relates to sealing elements for effecting a seal employable, for instance, when a rotatable shaft is to be sealed towards a stationary housing. In this connection, a tight seal is produced between a stationary sealing element connected to the static part and a second sealing element connected to the rotatable part. In order to provide good durability for these sealing elements the sealing ring, i.e., a part of one sealing element that is in contact with a corresponding sealing ring part of the other sealing element, usually is made of cemented carbide or another hard material.

It has, however, turned out to be difficult to manufacture sealing rings of solid cemented carbide having diameters greater than 300 mm. This has led to the fact that such sealing rings are manufactured of a more malleable but also considerably less wear-resistant material than cemented carbide. The consequence of this has been that the sealing elements in the machines involve more frequent replacement with long shut-down periods as a result, which means high operating costs of these machines.

The object of the present invention is to solve this problem and permit use of cemented carbide or another hard material even in sealing rings having diameters greater than 300 mm.

THE DRAWING

Two embodiments of the invention shall be described more closely below with reference to the accompanying drawing, in which FIG. 1 shows a sealing element according to one embodiment;

DETAILED DESCRIPTION OF PREFERRED EMBODIMENTS

Figure 1:
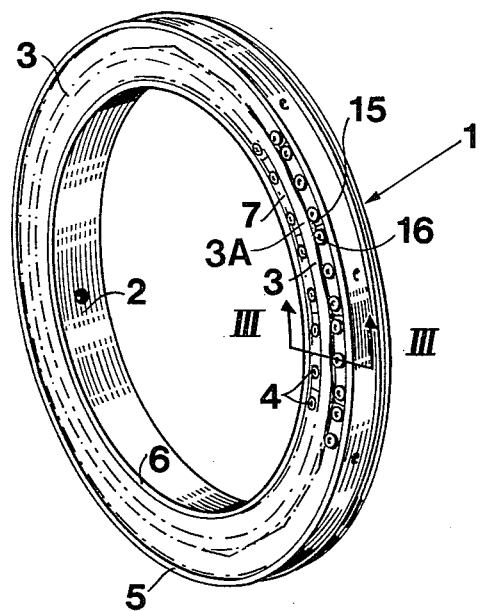
Figure 2:
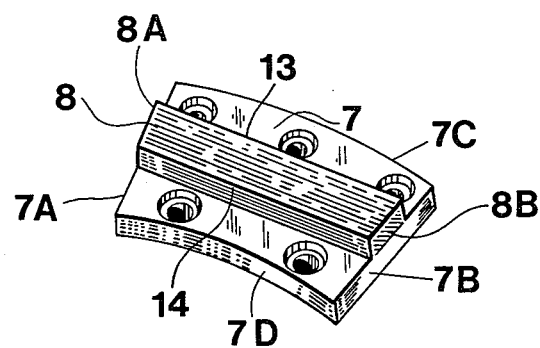
FIG. 2 shows a sealing segment.

Referring now to FIGS. 1 and 2 there is shown a sealing element 1 comprising an annular holder 2 of steel or another suitable material into which are fastened curved plates 7 of steel or another suitable material by means of screws or the like. The fastening of the plates 7 into the holder 2 can, instead of a screw joint, be made by means of welding or a shrinkage fit. In the last case the plate 7 is shrunk and/or the holder 2 is expanded. Actually, any suitable fastening can be used. The two ends 7A, B of the plates 7 are formed, such as by grinding for example, in such a way that they are oriented radially relative to the holder 2, i.e., are directed towards the center of the holder. Due to that fact, the plates 7 can be pressed closely to each other when fastened which is of greatest importance for the sealing function. The outer and inner sides 7C, D of the plate are curved in such a manner that the curve centers are coincident with the center of the holder. Onto the plates 7 are soldered rods 8 of cemented carbide or another suitable material. The rods 8 are thus oriented in annular fashion to form a sealing ring 3 which contacts a sealing ring of the cooperating sealing element (not shown). The rods 8 include short ends 8A, B ground in such a way that they are directly adapted to the ends of the plate 7, i.e., are radially disposed.

Figure 6:
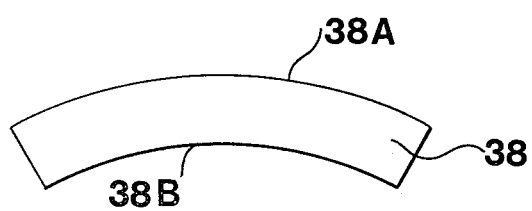
FIG. 6 depicts an embodiment wherein a cemented carbide rod is curved.

The rods 8 are preferably made straight for technical and economic reasons, since it is both complicated and expensive, although possible, to make curved rods of cemented carbide. A curved rod 38 is depicted in FIG. 6 wherein the rod includes curved outer and inner sides 38A, B. The straight rods are then bevelled when in place in the holder so that after the bevelling they form a continuously curved annular contact surface 3A which is axially facing and is planar, i.e., disposed in a plane perpendicular to the longitudinal axis of the holder.

Figure 3:
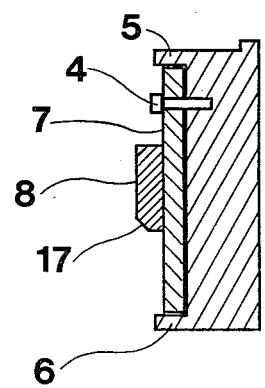
FIG. 3 is a cross-sectional view taken along line III—III in FIG. 1.

In order to obtain a curved contact surface the upper edge 13 of the cemented carbide rod 8 is, for the most part, bevelled at its ends at 15, 16 (FIG. 1), while its lower edge 14 is for the most part bevelled at a zone 17 in the middle of the rod (FIG. 3).

When producing the sealing element the sealing segments are placed between two radially spaced annular flanges 5, 6 in the holder 2, whereby good contact is obtained between the sides 7C, D and the flanges 5, 6. After that the segments are screwed up closely to each other with screws 4, the screws 4 being received in the holder 2. In this connection it has turned out to be very important that the screws are evenly fastened, and that the material of which the screws 4, plate 7 and the holder 2 are formed has about the same coefficient of thermal expansion which coefficient must not differ much from that of cemented carbide in order that the contact surface of the sealing ring 3 shall remain completely planar during work. Otherwise, the risk of leakage between the sealing rings of the sealing elements is very great.

Figure 4:
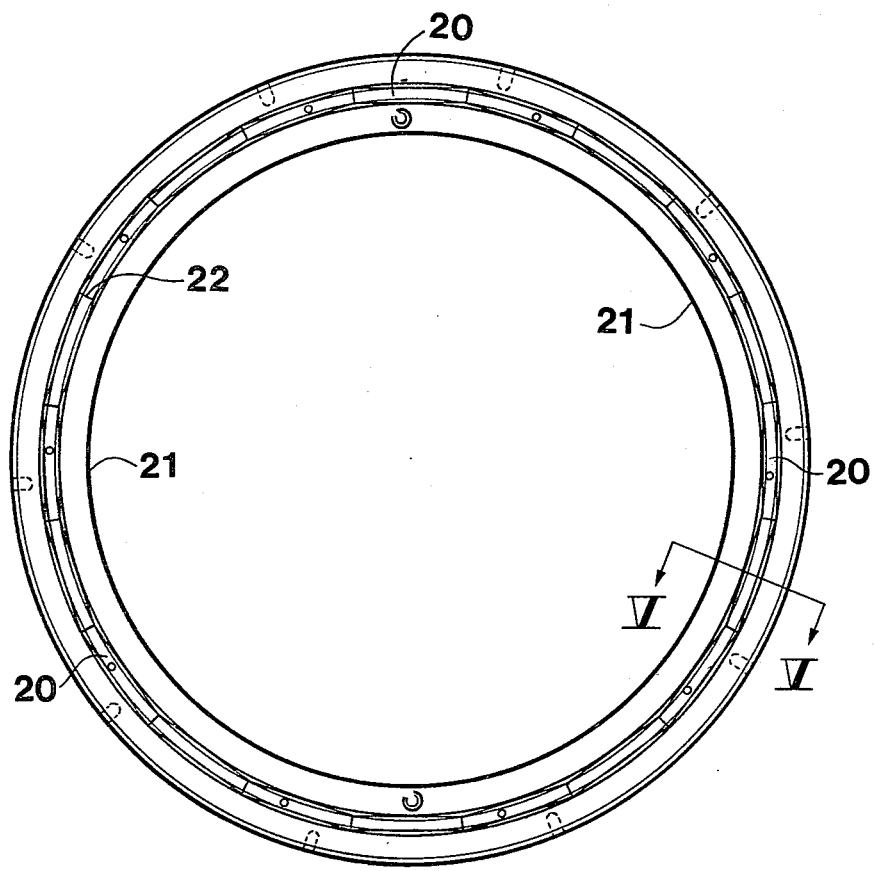
FIG. 4 shows a sealing element according to another embodiment.
Figure 5:
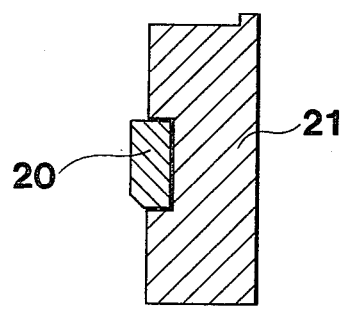
FIG. 5 is a cross-sectional view taken along line V—V in FIG. 4.

In FIG. 4, there is shown another embodiment of the invention. In this case the sealing ring comprises a great number of straight cemented carbide rods 20 which are fastened directly into an annular slot in the holder 21 by means of soldering. It is to be noted that instead of being fastened into a slot, the rods can be directly fastened on the holder. In order to obtain a curved contact surface the rod is bevelled in the same way as in the former case. Instead of being straight, the rods 20 can be curved. It is, however, as stated before, more complicated and expensive to make rods curved rather than straight. The short ends 22 of the rods shall be ground so as to be radial. In this way, the rods form a tight ring that eliminates leakage. In this connection it is important to note that the holder shall be made of a material, for instance alloyed steel, having a coefficient of thermal expansion which does not differ so much from that of cemented carbide.

The fastening of the rods 8 to the plates 7 and the rods 20 directly to the holder 21 is preferably made by soldering. The invention is, however, not limited to soldering. Thus, other fastening methods can be used, for instance shrinkage fit, gluing and welding.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A sealing element comprising a holder including radially spaced annular surfaces defining an axially open slot therebetween, a sealing ring comprising a plurality of plates which are axially insertable into said slot and connected to said holder to form a unit therewith, said plates including annular inner and outer walls engaging said radially spaced surfaces of said holder, said plates being more than two in number, a rod mounted on each of said plates so as to project axially therefrom, said rods being formed of cemented carbide, each rod extending the full length of its associated plate so that with said plates arranged in end-to-end relationship in said slot, said rods are arranged in end-to-end relationship to form a continuous axially facing annular contact surface the diameter of which is greater than 300 mm, said plates being retained in said slot by means of a shrinkage fit with said holder.

2. A sealing element according to claim 1, wherein said holder includes a radially extending wall interconnecting said radially spaced surfaces and defining an end wall of said slot, said plates abutting against said radially extending wall.

3. A sealing element according to claim 1, wherein said holder is formed of a material having the same coefficient of thermal expansion as the cemented carbide.

4. A sealing element according to claim 1, wherein each of said rods is straight.

5. A sealing element according to claim 4, wherein each of said rods includes beveled radial outer and inner edges so that a generally curved axially facing contact surface is formed.

6. A sealing element according to claim 1, wherein each of said rods is curvalinear about the axis of said slot.

7. A sealing element according to claim 1, wherein there are twenty of said rods.

8. A sealing element comprising a holder including radially spaced annular surfaces defining an axially open annular slot therebetween, a sealing ring comprising a plurality of rods which are more than two in number and formed of cemented carbide, said rods being axially insertable into said slot for engagement with said spaced surfaces to form a unit with said holder, and are arranged in end-to-end relationship within said slot to form a continuously axially facing annular contact surface the diameter of which is greater than 300 mm, said rods being retained within said slot by a shrinkage fit with said holder.

9. A sealing element according to claim 8, wherein each of said rods is straight.

10. A sealing element according to claim 9, wherein each of said rods includes beveled radial outer and inner edges so that a generally curved axially facing contact surface is formed.

11. A sealing element according to claim 1, wherein each of said rods is curvalinear about the axis of said slot.

12. A sealing element according to claim 1, wherein there are twenty rods.

13. A sealing element according to claim 8, wherein said holder includes a radially extending wall interconnecting said radially spaced surfaces and defining an end wall of said slot, said rods abutting against said radially extending wall.

14. A sealing element according to claim 8, wherein said holder is formed of a material having the same coefficient of thermal expansion as the cemented carbide.

* * * * *